US012637351B2

(12) United States Patent
Wang et al.

(10) Patent No.: US 12,637,351 B2
(45) Date of Patent: May 26, 2026

(54) METHOD FOR PREPARING HYDROGEN-RICH SYNTHESIS GAS BY DEGRADING POLYOLEFIN WASTE PLASTICS AT LOW TEMPERATURE

(71) Applicant: Zhejiang University, Hangzhou (CN)

(72) Inventors: Shurong Wang, Hangzhou (CN); Hongcai Su, Hangzhou (CN); Tian Li, Hangzhou (CN); Lingjun Zhu, Hangzhou (CN); Yunchao Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 814 days.

(21) Appl. No.: 17/987,894

(22) Filed: Nov. 16, 2022

(65) Prior Publication Data

US 2023/0084526 A1 Mar. 16, 2023

Related U.S. Application Data

(63) Continuation of application No. PCT/CN2021/098607, filed on Jun. 7, 2021.

(30) Foreign Application Priority Data

Jun. 3, 2021 (CN) .......................... 202110618861.6

(51) Int. Cl.
| | |
|---|---|
| *C01B 3/326* | (2026.01) |
| *B01J 21/18* | (2006.01) |
| *B01J 23/89* | (2006.01) |

(52) U.S. Cl.
CPC .............. *C01B 3/326* (2013.01); *B01J 21/18* (2013.01); *B01J 23/892* (2013.01);
(Continued)

(58) Field of Classification Search
CPC ................ C01B 3/326; C01B 2203/02; C01B 2203/1064; C01B 2203/1082;
(Continued)

(56) References Cited

U.S. PATENT DOCUMENTS

2020/0262997 A1 8/2020 Sasson et al.

FOREIGN PATENT DOCUMENTS

| CN | 106423199 A | 2/2017 |
|---|---|---|
| CN | 109054079 A | 12/2018 |

(Continued)

OTHER PUBLICATIONS

Translation of CN_109096535 (Year: 2018).*
(Continued)

*Primary Examiner* — Daniel Berns
*Assistant Examiner* — Joshua Maxwell Speer
(74) *Attorney, Agent, or Firm* — Bayramoglu Law Offices LLC

(57) ABSTRACT

A method for preparing hydrogen-rich synthesis gas by degrading waste polyolefin plastics at a low temperature includes the following steps: weighing 1 part by weight of polyolefin waste plastics and 3 parts-80 parts by weight of hydrogen peroxide containing 0.25%-6% of $H_2O_2$; feeding the polyolefin waste plastics and the hydrogen peroxide into a hydrothermal reactor, and carrying out the oxidation pretreatment reaction at a reaction temperature of 150° C.-230° C. under a reaction pressure of 0.5 MPa-2 MPa for 30 minutes-90 minutes, and obtaining an aqueous-phase product and a gas-phase product after the reaction is finished; filling another hydrothermal reactor with a mesoporous carbon supported metal-based catalyst, and then introducing the aqueous-phase product into the hydrothermal reactor for a reforming reaction to obtain a hydrogen-rich synthesis gas product. In the whole process, the $H_2$ yield
(Continued)

is close to 11 mol/kg plastics, and the $H_2$ concentration in the hydrogen-rich synthesis gas is close to 55%.

10 Claims, 5 Drawing Sheets

(52) U.S. Cl.
CPC .. *C01B 2203/02* (2013.01); *C01B 2203/1064* (2013.01); *C01B 2203/1082* (2013.01); *C01B 2203/1247* (2013.01); *C01B 2203/1258* (2013.01)

(58) Field of Classification Search
CPC .... C01B 2203/1247; C01B 2203/1258; C01B 2203/1058; C01B 3/02; C01B 3/40; C01B 2203/0227; C01B 2203/1047; C01B 2203/107; B01J 21/18; B01J 23/892; B01J 35/638; B01J 35/647; B01J 35/618; B01J 23/42; B01J 23/755; B01J 37/0201; B01J 37/18; C07C 51/285; C08J 11/12; C08J 2323/02; Y02W 30/62
See application file for complete search history.

(56) References Cited

FOREIGN PATENT DOCUMENTS

| | | | | | |
|---|---|---|---|---|---|
| CN | 109096535 A | * | 12/2018 | .............. | C08J 11/14 |
| CN | 110819372 A | | 2/2020 | | |

OTHER PUBLICATIONS

Hongcai Su, et al., Production of H2-rich syngas from gasification of unsorted food waste in supercritical water, Waste Management, 2020, pp. 520-527, vol. 102.
Bin Bai, et al., Experimental study on gasification performance of polypropylene (PP) plastics in supercritical water, Energy, 2020, pp. 1-10, vol. 191, 116527.

* cited by examiner

METHOD FOR PREPARING HYDROGEN-RICH SYNTHESIS GAS BY DEGRADING POLYOLEFIN WASTE PLASTICS AT LOW TEMPERATURE

CROSS REFERENCE TO THE RELATED APPLICATIONS

The application is a Continuation Application of International Application No. PCT/CN2021/098607, filed on Jun. 7, 2021, which is based on and claims priority on Chinese patent application No. 202110618861.6, filed on Jun. 3, 2021, the entire contents of which are incorporated herein by reference.

TECHNICAL FIELD

The present application relates to the technical field of plastic degradation, in particular to the technical field of preparing hydrogen-rich synthesis gas by degrading polyolefin waste plastics at a low temperature.

BACKGROUND

As one of the main synthetic materials, plastic occupies an important position in the field of materials. China is the largest plastic producer in the world, which produces a huge amount of plastic waste every year, and part of plastics that is difficult to decompose enters the natural environment on land and in the ocean, which has a great impact on the ecological environment. At present, several typical waste plastics include polyethylene, polypropylene, polyethylene terephthalate, polyvinyl chloride, polycarbonate, polystyrene and acrylonitrile butadiene styrene plastics. Among them, polyolefin plastics such as polyethylene and polypropylene are the most widely used, and account for the largest proportion in the total amount of waste plastics. In addition, as the main material of medical masks, during COVID-19, the output of polypropylene raw materials and its waste increased sharply, while the main methods commonly used to treat domestic plastic waste at present are landfill and incineration, which will cause secondary pollution and waste of resources to a great extent. Therefore, it becomes a hot spot to efficiently convert plastics into clean energy such as hydrogen energy.

Aqueous-phase reforming is a low-temperature and low-pressure hydrogen production technology. Under the hydrothermal conditions of 200° C.-260° C. and 1.5 MPa-4 MPa, liquid oxygen-containing organic matter can be converted into hydrogen ($H_2$) by the catalysis of a catalyst. As a kind of solid waste, waste polyolefin plastics do not contain oxygen atoms, so it is impossible to directly carry out aqueous-phase reforming to produce $H_2$.

At present, the method of preparing $H_2$ from waste plastics is mainly high-temperature pyrolysis gasification (500° C.-800° C.), which is accompanied by the production of by-products such as coke and tar. A higher reaction temperature also leads to a higher investment cost. In addition, previous studies (Waste Management 2020, 102, 520-7, Energy 2020, 191, 116527) have proposed that supercritical water gasification (T>374° C., P>22.1 MPa) can be used to convert plastics into $H_2$. Because the operation of supercritical water gasification has high requirements for the equipment, it has certain limitations in industrial application. In addition, at present, the $H_2$ yield (2 mol/kg-5 mol/kg plastic) and $H_2$ concentration in the synthesis gas obtained by converting polyethylene and polypropylene into $H_2$ by supercritical water gasification are not high (10%-40%).

SUMMARY

The purpose of the present application is to solve the problems in the prior art, and propose a method for preparing $H_2$-rich synthesis gas by degrading waste polyolefin plastics at a low temperature. In the first stage, a dilute $H_2O_2$ solution is used to pretreat waste polyolefin plastics such as polyethylene and polypropylene at a reaction temperature lower than 250° C., and in the second stage, a aqueous phase obtained by a pretreatment is reformed at a low temperature under the catalysis of a high-efficiency carbon-based catalyst to produce hydrogen, thus realizing high-efficiency $H_2$ production of polyolefin plastics under mild conditions.

In order to achieve the above purpose, the present application provides a method for preparing $H_2$-rich synthesis gas by degrading waste polyolefin plastics at a low temperature, which adopts a two-step method combining an oxidation pretreatment with a reforming reaction, and includes the following steps:

(1) weighing 1 part by weight of polyolefin plastics and more than 3 parts by weight of hydrogen peroxide, wherein a concentration of $H_2O_2$ in the hydrogen peroxide solution is 0.25%-6%;

(2) feeding the weighed polyolefin plastics and hydrogen peroxide solution into a hydrothermal reactor, and carrying out an oxidation pretreatment reaction at a reaction temperature of 150° C.-230° C., and obtaining an aqueous-phase product and a gas-phase product after the reaction is finished;

wherein $H_2O_2$ in the reaction solution is completely decomposed, and the product does not contain $H_2O_2$ under detection, therefore there will be no residual $H_2O_2$ that will have negative effects on the catalyst of the reforming reaction in the second stage;

(3) filling another hydrothermal reactor with a mesoporous carbon supported metal-based catalyst, and then introducing the aqueous-phase product obtained in step (2) into the hydrothermal reactor for a reforming reaction to obtain a $H_2$-rich synthesis gas product; wherein steps (1) and (2) belongs to the oxidation pretreatment stage, and step (3) belongs to the reforming reaction stage.

Preferably, a content of $H_2O_2$ in the hydrogen peroxide in the step (1) is 0.5%-2%;

As a strong oxidant, $H_2O_2$ with a high concentration can easily lead to the bad conditions of oxidative cracking of C—C bonds, while a too low concentration of $H_2O_2$ can lead to insufficient oxidation. Therefore, 0.25%-6% of $H_2O_2$ can effectively pre-oxidize polyolefin plastics at a low temperature, and when the content of $H_2O_2$ is 0.5%-2%, the yield and concentration of $H_2$ obtained by the second reforming reaction are the best.

Preferably, a weight of hydrogen peroxide in the step (1) is 3 parts-80 parts by weight.

Preferably, a weight of hydrogen peroxide in the step (1) is 5 parts-10 parts by weight.

The residual hydrogen peroxide in the pretreatment has negative effects, for example oxidation, on the metal catalyst in the second reforming reaction. At a higher weight ratio of $H_2O_2$ to polyolefin plastics, the reforming reaction process will produce more $CO_2$, resulting in a decrease in the molar fraction of $H_2$ in the gas product. The best weight of hydrogen peroxide is 5 parts-10 parts by weight.

Preferably, the reaction pressure in the step (2) is 0.5 MPa-2 MPa and the reaction time is 30 min-90 min.

Preferably, in the step (2), the reaction temperature is 190° C.-200° C., the reaction pressure is 1 MPa, and the reaction time is 30 min-60 min.

Preferably, in the step (2), the reaction temperature is 200° C. and the reaction time is 60 min.

When the reaction temperature is too low, the oxidation reaction of polyolefin plastics is weakened; when the reaction temperature is too high, the organic matter may undergo decarboxylation, that is, the thermal cracking of the long-chain carboxylic acid, and the oxidation time is too long, which is unfavorable to the oxidation reaction and reforming reaction of polyolefin plastics.

Preferably, a main component of the aqueous-phase product obtained in the step (2) is acetic acid, and the gas-phase product is $O_2$ and $CO_2$.

The aqueous-phase product is mainly acetic acid, and the contents of formic acid, propionic acid and other short-chain micromolecule acids are very low, which will not adversely affect the activity of the reforming catalyst.

Preferably, the reaction temperature of the reforming reaction in step (3) is 200° C.-240° C., the reaction pressure is 2 MPa-4 MPa, and the reaction time is 120 min-180 min.

Preferably, the mesoporous carbon supported metal-based catalyst in step (3) is one or more of mesoporous carbon supported Ru monometal, mesoporous carbon supported Ni monometal, mesoporous carbon supported Pt monometal and mesoporous carbon supported Ru—Ni bimetal.

The specific surface area of the selected mesoporous carbon is 1400 $m^2$/g-1500 $m^2$/g, which can provide more active sites.

Preferably, the mesoporous carbon supported metal-based catalyst in step (3) is a mesoporous carbon supported Ru—Ni bimetallic catalyst, and a mass ratio of Ru to Ni is 4:1, 1:1 or 1:4.

The mesoporous carbon supported Ru monometallic catalyst shows the highest $H_2$ selectivity for polyolefin oxidation pretreatment, and the highest $H_2$ yield and $H_2$ concentration are obtained under the catalysis of the mesoporous carbon supported Ru monometallic catalyst. However, considering the high price of Ru metal, the low stability of the mono-metallic catalyst in a hydrothermal environment and its trend to deactivation, adding non-noble metals to replace part of the active metal Ru can effectively reduce the cost of the catalyst under the condition of keeping the total amount of supported metals unchanged. In addition, the mesoporous carbon supported Ru—Ni bimetallic catalyst provided by the present application realizes the multiple increase of $H_2$ yield, and the formation of RuNi alloy in the preparation process greatly improves the stability of the catalyst.

Preferably, the polyolefin plastics are selected from one or more of polypropylene, low density polyethylene and high density polyethylene.

Preferably, the preparation steps of the mesoporous carbon supported metal-based catalyst are as follows: firstly, sieving mesoporous carbon to 120 meshes-150 meshes; according to the total metal loading amount of 5 wt %, adding adding a certain amount of mesoporous carbon and soluble metal precursor into deionized water, and after uniformly stirring and immersing at room temperature for 12 hours, continuously stirring the mixture at 80° C. until the water was evaporated to dryness, and drying the obtained sample in an oven at 105° C. for 12 hours; finally, reducing in 10% $H_2$-90% Ar at 550° C. for 4 hours.

According to the present application, a two-step method combining an oxidation pretreatment with a reforming reaction is adopted, so that polyolefin can be degraded at a low temperature and $H_2$ can be produced efficiently, and the two stages cooperate to produce the following beneficial effects:

(1) The present application adopts a two-step $H_2$ production method; on the one hand, it realizes high-efficiency $H_2$ production from polyolefin waste plastics at a temperature lower than 250° C., and the $H_2$ yield is close to 11 mol/kg plastic, which reduces energy consumption and operation cost, and on the other hand, it realizes high-efficiency degradation of polyolefin waste plastics, and has high utilization value in treating polyolefin plastics waste.

(2) In the oxidation pretreatment stage, $H_2O_2$ is used as a strong oxidant; when the concentration is high (6%-8%), the raw materials will be over-oxidized, resulting in the oxidative cracking of C—C bonds, resulting in a higher by-product $CO_2$ yield; controlling the concentration of $H_2O_2$ to 0.25%-6% will obviously reduce the $CO_2$ yield, which can effectively weaken the peroxidation of carboxylic acids produced in the pre-oxidation stage, thus ensuring more carboxylic acids in the second hydrogen production process.

(3) The weight ratio of hydrogen peroxide to polyolefin is controlled to be 5:1-10:1, so that the product produced in the oxidation pretreatment stage does not contain hydrogen peroxide, and there will be no negative influence of residual hydrogen peroxide on the oxidation of the metal catalyst in the second reforming reaction.

(4) Low-concentration hydrogen peroxide in the reaction solution can selectively oxidize and break carbon-carbon bonds in polyolefin plastics under low-temperature hydrothermal environment, forming small molecular intermediates such as aldehydes, which are then quickly oxidized into organic acids such as acetic acid, thus realizing the degradation of polyolefin plastics at a low temperature.

(5) According to the present application, in the first stage of oxidation pretreatment reaction, a product mainly composed of acetic acid is obtained, and other short-chain micromolecule acids such as formic acid and propionic acid have very low content, and the yield of acetic acid is 1.5 mol/kg-2 mol/kg plastic, and the reaction activity of acetic acid is lower than that of formic acid, so that the activity of carbon-based catalyst will not be adversely affected, which is beneficial to the second stage of reforming reaction to produce hydrogen;

(6) The Ru—Ni bimetallic catalyst supported by mesoporous carbon selected by the present application realizes multiple increase of $H_2$ yield, and RuNi alloy is formed in the preparation process, which greatly improves the stability of the catalyst.

(7) Compared with supercritical water gasification of polyolefin plastics for hydrogen production, the method not only greatly reduces the reaction temperature and pressure, but also realizes the hydrogen production of polyolefin under mild hydrothermal conditions, and the obtained $H_2$ yield and $H_2$ concentration are higher.

(8) Mesoporous carbon supported Ru monometallic catalyst showed the highest $H_2$ selectivity for polyolefin oxidation pretreatment, and the highest $H_2$ yield and $H_2$ concentration were obtained under the catalysis of mesoporous carbon supported Ru monometallic catalyst. However, considering the high price of Ru metal, the low stability of monometallic catalyst in hydrothermal environment and its easy deactivation, adding non-noble metals to replace some active metals Ru can effectively reduce the cost of the catalyst under the condition of keeping the total amount of supported metals unchanged. In addition, the mesoporous carbon supported Ru—Ni bimetallic catalyst provided by the present application realizes the multiple increase of $H_2$ yield, and the formation of RuNi alloy in the preparation process greatly improves the stability of the catalyst.

DETAILED DESCRIPTION OF THE EMBODIMENTS

Example 1

Figure 1:
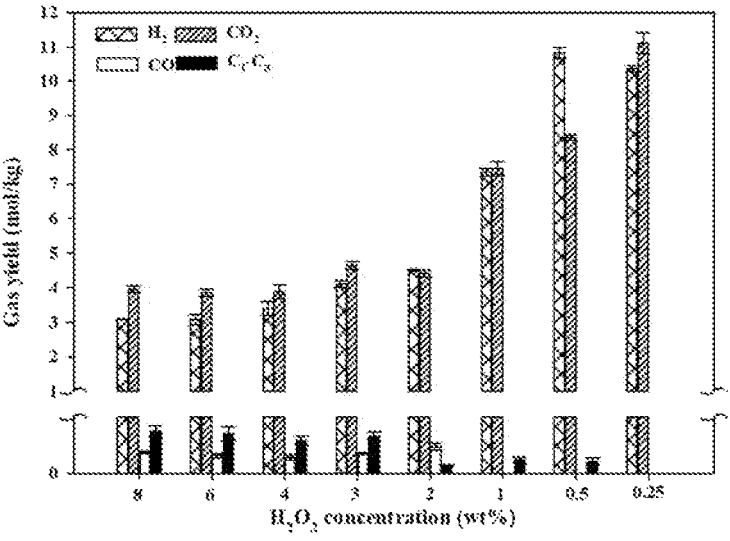
FIG. 1 is a graph showing the change of the concentration of $H_2O_2$ and the yield of each product in the present application.

Step 1: Commercial 30% $H_2O_2$ of hydrogen peroxide solution was diluted with deionized water to prepare 80 ml of 6% $H_2O_2$ hydrogen peroxide, and 0.16 g of low density polyethylene and the prepared dilute hydrogen peroxide solution were loaded into a hydrothermal reactor so that the $H_2O_2$-plastic ratio was 10:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2: the aqueous-phase product of the first stage of oxidation pretreatment was introduced into a reactor filled with a mesoporous carbon supported Ru monometallic catalyst; the reaction conditions were: a reaction temperature of 240° C., a reaction time of 120 min, and a reaction pressure of 4 MPa.

The preparation method of mesoporous carbon supported Ru monometallic catalyst comprised the following steps: sieving mesoporous carbon to 120-150 meshes; according to the total metal loading of 5 wt %, adding a certain amount of mesoporous carbon and ruthenium chloride into deionized water, stirring and immersing at room temperature for 12 hours, then continuing to stir at 80° C. until the water was evaporated to dryness, and drying the obtained sample in an oven at 105° C. for 12 hours; reducing in 10% $H_2$-90% Ar at 550° C. for 4 hours.

Example 2

Step 1: Commercial 30% $H_2O_2$ hydrogen peroxide was diluted with deionized water to prepare 80 ml of 4% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 10:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 3

Step 1: Commercial 30% $H_2O_2$ of hydrogen peroxide solution was diluted with deionized water to prepare 80 ml of 2% $H_2O_2$ hydrogen peroxide, and 0.16 g of low density polyethylene and the prepared dilute hydrogen peroxide solution were load into a hydrothermal reactor so that the $H_2O_2$ to plastic ratio was 10:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 4

Step 1: Commercial 30% $H_2O_2$ hydrogen peroxide was diluted with deionized water to prepare 80 ml of 1% $H_2O_2$ of hydrogen peroxide solution, and 0.16 g of low density polyethylene and the prepared dilute hydrogen peroxide solution were loaded into a hydrothermal reactor so that the $H_2O_2$ to plastic ratio was 10:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 5

Step 1: Commercial 30% $H_2O_2$ of hydrogen peroxide solution was diluted with deionized water to prepare 80 ml of 0.5% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 10:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 6

Step 1: Commercial 30% $H_2O_2$ of hydrogen peroxide solution was diluted with deionized water to prepare 80 ml of 0.25% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 10:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 7

Step 1: Commercial 30% $H_2O_2$ of hydrogen peroxide solution was diluted with deionized water to prepare 80 ml of 0.5% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 3:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 8

Step 1: Commercial 30% $H_2O_2$ of hydrogen peroxide solution was diluted with deionized water to prepare 80 ml of 0.5% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 5:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and 02.

Step 2 was the same as step 2 of Example 1; the catalyst was prepared in the same way as in Example 1.

Example 9

Step 1: Commercial 30% $H_2O_2$ of hydrogen peroxide solution was diluted with deionized water to prepare 80 ml of 0.5% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 20:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 10

Step 1: Commercial 30% $H_2O_2$ of hydrogen peroxide solution was diluted with deionized water to prepare 80 ml of 0.5% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 40:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 11

Step 1: Commercial 30% $H_2O_2$ of hydrogen peroxide solution was diluted with deionized water to prepare 80 ml of 0.5% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 80:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 12

Step 1: Commercial 30% $H_2O_2$ of hydrogen peroxide solution was diluted with deionized water to prepare 80 ml of 0.5% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 10:1; the reaction conditions were: a reaction temperature of 180° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 13

Step 1: Commercial 30% $H_2O_2$ of hydrogen peroxide solution was diluted with deionized water to prepare 80 ml of 0.5% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 10:1; the reaction conditions were: a reaction temperature of 190° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 14

Step 1: Commercial 30% $H_2O_2$ of hydrogen peroxide solution was diluted with deionized water to prepare 80 ml of 0.5% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 10:1; the reaction conditions were: a reaction temperature of 210° C., a reaction time of 60 min, reaction pressure 2 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 15

Step 1 was the same as step 1 of Example 1.

Step 2: the aqueous-phase product of the first stage of oxidation pretreatment was introduced into a reactor filled with a mesoporous carbon supported Ni monometal catalyst; the reaction conditions were: a reaction temperature of 240° C., a reaction time of 120 min, and a reaction pressure of 4 MPa.

The preparation method of the mesoporous carbon supported Ni monometal catalyst included the following steps: sieving mesoporous carbon to 120-150 meshes; according to the total metal loading of 5 wt %, adding a certain amount of mesoporous carbon and nickel chloride hexahydrate added into deionized water, stirring and immersing at room temperature for 12 hours, then continuing to stir at 80° C. until the water was evaporated to dryness, and drying the obtained sample in an oven at 105° C. for 12 hours; reducing in 10% H2-90% Ar at 550° C. for 4 hours.

Example 16

Step 1 was the same as step 1 of Example 1.

Step 2: the aqueous-phase product of the first stage of oxidation pretreatment was introduced into a reactor filled with a mesoporous carbon supported Pt monometallic catalyst; the reaction conditions were: a reaction temperature of 240° C., a reaction time of 120 min, and a reaction pressure of 4 MPa.

The preparation method of the mesoporous carbon supported Pt monometallic catalyst included the following steps: sieving mesoporous carbon to 120-150 meshes; according to the total metal loading of 5 wt %, adding a certain amount of mesoporous carbon and chloroplatinic acid into deionized water, stirring and immersing at room temperature for 12 hours, then continuing to stir at 80° C. until the water was evaporated to dryness, and drying the obtained sample in an oven at 105° C. for 12 hours; reducing in 10% H2-90% Ar at 550° C. for 4 hours.

Example 17

Step 1 was the same as step 1 of Example 1.

Step 2, the aqueous-phase product of the first stage of oxidation pretreatment was introduced into a reactor filled with a mesoporous carbon supported Ru—Ni bimetallic catalyst, wherein the mass ratio of Ru to Ni in the mesoporous carbon supported Ru—Ni bimetallic catalyst was 4:1; the reaction conditions were: a reaction temperature of 240° C., a reaction time of 120 min, a reaction pressure of 4 MPa.

The preparation method of the Ru—Ni bimetallic catalyst supported by mesoporous carbon included the following steps: sieving mesoporous carbon to 120-150 meshes; according to the total metal loading of 5 wt %, adding a certain amount of mesoporous carbon, nickel chloride hexahydrate and ruthenium chloride into deionized water in proportion, stirred and immersed at room temperature for 12 hours, then continuing to stir at 80° C. until the water was evaporated, and drying the obtained sample in an oven at 105° C. for 12 hours; reducing in 10% H2-90% Ar at 550° C. for 4 hours.

Example 18

Step 1 was the same as step 1 of Example 1.

Step 2, the aqueous-phase product of the first stage of oxidation pretreatment was introduced into a reactor filled with a mesoporous carbon supported Ru—Ni bimetallic catalyst, wherein the mass ratio of Ru to Ni in the mesoporous carbon supported Ru—Ni bimetallic catalyst was 1:1; the reaction conditions were: a reaction temperature of 240° C., a reaction time of 120 min, a reaction pressure of 4 MPa.

The preparation method of the Ru—Ni bimetallic catalyst supported by mesoporous carbon included the following steps: sieving mesoporous carbon to 120-150 meshes; according to the total metal loading of 5 wt %, adding a certain amount of mesoporous carbon, nickel chloride hexahydrate and ruthenium chloride into deionized water in proportion, stirred and immersed at room temperature for 12 hours, then continuing to stir at 80° C. until the water was evaporated, and drying the obtained sample in an oven at 105° C. for 12 hours; reducing in 10% H2-90% Ar at 550° C. for 4 hours.

Example 19

Step 1 was the same as step 1 of Example 1.

Step 2, the aqueous-phase product of the first stage of oxidation pretreatment was introduced into a reactor filled with a mesoporous carbon supported Ru—Ni bimetallic catalyst, wherein the mass ratio of Ru to Ni in the mesoporous carbon supported Ru—Ni bimetallic catalyst was 1:4; the reaction conditions were: a reaction temperature of 240° C., a reaction time of 120 min, a reaction pressure of 4 MPa.

The preparation method of the Ru—Ni bimetallic catalyst supported by mesoporous carbon included the following steps: sieving mesoporous carbon to 120-150 meshes; according to the total metal loading of 5 wt %, adding a certain amount of mesoporous carbon, nickel chloride hexahydrate and ruthenium chloride into deionized water in proportion, stirred and immersed at room temperature for 12 hours, then continuing to stir at 80° C. until the water was evaporated, and drying the obtained sample in an oven at 105° C. for 12 hours; reducing in 10% H2-90% Ar at 550° C. for 4 hours.

Example 20

Step 1 was the same as step 1 of Example 1.

Step 2: the aqueous-phase product of the first stage of oxidation pretreatment was introduced into a reactor filled with mesoporous carbon-loaded Ru—Ni bimetallic catalyst, wherein the mesoporous carbon-loaded Ru—Ni bimetallic catalyst was the mesoporous carbon-loaded Ru—Ni bimetallic catalyst recovered in Example 17; the reaction conditions were: a reaction temperature of 240° C., a reaction time of 120 min, a reaction pressure of 4 MPa.

Example 21

Step 1 was the same as step 1 of Example 1.

Step 2: the aqueous-phase product of the first stage of oxidation pretreatment was introduced into a reactor filled with mesoporous carbon-loaded Ru—Ni bimetallic catalyst, wherein the mesoporous carbon-loaded Ru—Ni bimetallic catalyst was the mesoporous carbon-loaded Ru—Ni bimetallic catalyst recovered in Example 20; the reaction conditions were: a reaction temperature of 240° C., a reaction time of 120 min, a reaction pressure of 4 MPa.

Example 22

Step 1 was the same as step 1 of Example 1.

Step 2: the aqueous-phase product of the first stage of oxidation pretreatment was introduced into a reactor filled with mesoporous carbon-loaded Ru—Ni bimetallic catalyst, wherein the mesoporous carbon-loaded Ru—Ni bimetallic catalyst was the mesoporous carbon-loaded Ru—Ni bimetallic catalyst recovered in Example 21; the reaction conditions were: a reaction temperature of 240° C., a reaction time of 120 min, a reaction pressure of 4 MPa.

Example 23

Step 1 was the same as step 1 of Example 1.

Step 2: the aqueous-phase product of the first stage of oxidation pretreatment was introduced into a reactor filled with mesoporous carbon-loaded Ru monometallic catalyst, wherein the Ru monometallic catalyst was the Ru monometallic catalyst recovered in Example 5; the reaction conditions were: a reaction temperature of 240° C., a reaction time of 120 min, a reaction pressure of 4 MPa.

Example 24

Step 1 was the same as step 1 of Example 1.

Step 2: the aqueous-phase product of the first stage of oxidation pretreatment was introduced into a reactor filled with mesoporous carbon-loaded Ru—Ni bimetallic catalyst, wherein the mesoporous carbon-loaded Ru—Ni bimetallic catalyst was the mesoporous carbon-loaded Ru—Ni bimetallic catalyst recovered in Example 23; the reaction conditions were: a reaction temperature of 240° C., a reaction time of 120 min, a reaction pressure of 4 MPa.

Example 25

Step 1 was the same as step 1 of Example 1.

Step 2: the aqueous-phase product of the first stage of oxidation pretreatment was introduced into a reactor filled with mesoporous carbon-loaded Ru—Ni bimetallic catalyst, wherein the mesoporous carbon-loaded Ru—Ni bimetallic catalyst was the mesoporous carbon-loaded Ru—Ni bimetallic catalyst recovered in Example 24; the reaction conditions were: a reaction temperature of 240° C., a reaction time of 120 min, a reaction pressure of 4 MPa.

Example 26

Step 1: commercial 30% $H_2O_2$ of hydrogen peroxide solution was diluted with deionized water to prepare 80 ml of 0.5% $H_2O_2$ of hydrogen peroxide solution, and 0.16 g of high density polyethylene and the prepared dilute hydrogen peroxide solution were loaded into a hydrothermal reactor, so that the ratio of $H_2O_2$ to plastic was 10:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 17; the catalyst was prepared in the same way as in Example 17.

Example 27

Step 1: commercial 30% $H_2O_2$ of hydrogen peroxide solution was diluted with deionized water to prepare 80 ml of 2% $H_2O_2$ of hydrogen peroxide solution, and 0.16 g polypropylene and the prepared dilute hydrogen peroxide solution were loaded into a hydrothermal reactor so that the ratio of $H_2O_2$ to plastic was 10:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 28

Step 1: commercial 30% $H_2O_2$ of hydrogen peroxide solution was diluted with deionized water to prepare 80 ml of 1% $H_2O_2$ of hydrogen peroxide solution, and 0.16 g polypropylene and the prepared dilute hydrogen peroxide solution were loaded into a hydrothermal reactor so that the ratio of $H_2O_2$ to plastic was 10:1; the reaction conditions were: a reaction temperature of 200° C., a reaction time of 60 min, a reaction pressure of 0.5 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 29

Step 1: commercial 30% $H_2O_2$ of hydrogen peroxide solution was diluted with deionized water to prepare 80 ml of 0.5% $H_2O_2$ of hydrogen peroxide solution, and 0.16 g of high density polyethylene and the prepared dilute hydrogen peroxide solution were loaded into a hydrothermal reactor, so that the ratio of $H_2O_2$ to plastic was 10:1; the reaction conditions were: a reaction temperature of 200° C., reaction time 30 min, reaction pressure 1 MPa; the main aqueous-phase product obtained by the pretreatment was acetic acid, and the gas-phase products were $CO_2$ and $O_2$.

Step 2: the aqueous-phase product of the first stage of oxidation pretreatment was introduced into a reactor filled with a mesoporous carbon supported Ru—Ni bimetallic catalyst, wherein the mass ratio of Ru to Ni in the mesoporous carbon supported Ru—Ni bimetallic catalyst was 4:1; the reaction conditions were: a reaction temperature of 200° C., reaction time 180 min and reaction pressure 2 MPa.

The catalyst was prepared in the same way as in Example 16.

Example 30

Step 1: commercial 30% $H_2O_2$ hydrogen peroxide solution was diluted with deionized water to prepare 80 ml of 0.5% $H_2O_2$ hydrogen peroxide solution, and 0.16 g of high density polyethylene and the prepared dilute hydrogen peroxide solution were loaded into a hydrothermal reactor, so that the ratio of $H_2O_2$ to plastic was 10:1; the reaction conditions were: a reaction temperature of 200° C., reaction time 90 min, reaction pressure 1 MPa; the main aqueous-phase product obtained by the pretreatment was acetic acid, and the gas-phase products were $CO_2$ and $O_2$.

Step 2 was the same as step 2 of Example 29; the catalyst was prepared in the same way as in Example 17.

Example 31

Step 1: commercial 30% $H_2O_2$ hydrogen peroxide solution was diluted with deionized water to prepare 80 ml of 0.5% $H_2O_2$ hydrogen peroxide solution, and 0.16 g of low density polyethylene and the prepared dilute hydrogen peroxide solution were loaded into a hydrothermal reactor so that the ratio of $H_2O_2$ to plastic was 10:1; the reaction conditions were: a reaction temperature of 150° C., a reaction time of 60 min, reaction pressure 2 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 32

Step 1: commercial 30% $H_2O_2$ of hydrogen peroxide solution was diluted with deionized water to prepare 80 ml of 0.5% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 10:1; the reaction aqueous-phase product obtained by the pretreatment was acetic acid, and the gas-phase products were $CO_2$ and $O_2$.

Step 2 was the same as step 2 of Example 1; the catalyst was prepared in the same way as in Example 1.

The gas-phase products obtained from the catalytic reforming of Examples 1-33 were tested by gas chromatography, and the related indexes were calculated. The experimental data are shown in Table 1:

TABLE 1

| Example | Pretreatment temperature (° C.) | Pretreatment time (min) | $H_2O_2$ concentration | $H_2O_2$-plastic ratio | Reforming temperature (° C.) | Reforming catalyst | $H_2$ yield Mol/kg plastic | $H_2$ concentration (%) |
|---|---|---|---|---|---|---|---|---|
| one | 200 | 60 | six | 10:1 | 240 | Ru/MEC | 3.07 | 41.7 |
| 2 | 200 | 60 | four | 10:1 | 240 | Ru/MEC | 3.41 | 44.3 |
| three | 200 | 60 | 2 | 10:1 | 240 | Ru/MEC | 4.52 | 49.1 |
| four | 200 | 60 | one | 10:1 | 240 | Ru/MEC | 7.35 | 48.6 |
| five | 200 | 60 | 0.5 | 10:1 | 240 | Ru/MEC | 10.83 | 51.5 |
| six | 200 | 60 | 0.25 | 10:1 | 240 | Ru/MEC | 10.34 | 49.2 |
| seven | 200 | 60 | 0.5 | 3:1 | 240 | Ru/MEC | 2.3 | 51.1 |
| eight | 200 | 60 | 0.5 | 5:1 | 240 | Ru/MEC | 4.7 | 53.6 |
| nine | 200 | 60 | 0.5 | 20:1 | 240 | Ru/MEC | 13.1 | 45.3 |
| 10 | 200 | 60 | 0.5 | 40:1 | 240 | Ru/MEC | 15.2 | 44.7 |
| 11 | 200 | 60 | 0.5 | 80:1 | 240 | Ru/MEC | 15.3 | 42.1 |
| 12 | 180 | 60 | 0.5 | 10:1 | 240 | Ru/MEC | 5.29 | 47.2 |
| 13 | 190 | 60 | 0.5 | 10:1 | 240 | Ru/MEC | 8.22 | 48.9 |
| 14 | 210 | 60 | 0.5 | 10:1 | 240 | Ru/MEC | 9.92 | 50.6 |
| 15 | 200 | 60 | 0.5 | 10:1 | 240 | Ni/MEC | 2.89 | 27.1 |
| 16 | 200 | 60 | 0.5 | 10:1 | 240 | Pt/MEC | 5.06 | 32.2 |
| 17 | 200 | 60 | 0.5 | 10:1 | 240 | 4Ru-1Ni/MEC | 9.58 | 45.1 |
| 18 | 200 | 60 | 0.5 | 10:1 | 240 | 1Ru-1Ni/MEC | 5.54 | 45 |
| 19 | 200 | 60 | 0.5 | 10:1 | 240 | 1Ru-4Ni/MEC | 4.37 | 34 |
| 20 | 200 | 60 | 0.5 | 10:1 | 240 | 4Ru-1Ni/MEC recovered in Example 17 | 7.29 | 49.1 |
| 21 | 200 | 60 | 0.5 | 10:1 | 240 | 4Ru-1Ni/MEC recovered in Example 20 | 7.43 | 49.1 |
| 22 | 200 | 60 | 0.5 | 10:1 | 240 | 4Ru-1Ni/MEC recovered in Example 21 | 7.4 | 49.1 |
| 23 | 200 | 60 | 0.5 | 10:1 | 240 | Ru/MEC recovered in Example 5 | 7.34 | 49.1 |
| 24 | 200 | 60 | 0.5 | 10:1 | 240 | Ru/MEC recovered in Example 23 | 7.25 | 49.1 |
| 25 | 200 | 60 | 0.5 | 10:1 | 240 | Ru/MEC recovered in Example 24 | 6.77 | 49.1 |
| 26 | 200 | 60 | 0.5 | 10:1 | 240 | 4Ru-1Ni/MEC | 8.61 | 42.7 |
| 27 | 200 | 60 | 2 | 10:1 | 240 | Ru/MEC | 6.5 | 48 |
| 28 | 200 | 60 | one | 10:1 | 240 | Ru/MEC | 7.2 | 46 |
| 29 | 200 | 30 | 0.5 | 10:1 | 200 | 4Ru-1Ni/MEC | 8.8 | 36.7 |
| 30 | 200 | 90 | 0.5 | 10:1 | 240 | 4Ru-1Ni/MEC | 9.41 | 52.5 |
| 31 | 150 | 60 | 0.5 | 10:1 | 240 | Ru/MEC | 3.35 | 43.4 |
| 32 | 220 | 60 | 0.5 | 10:1 | 240 | Ru/MEC | 10.30 | 51.13 |
| 33 | 230 | 60 | 0.5 | 10:1 | 240 | Ru/MEC | 8.61 | 51.26 |

Note: MEC is mesoporous carbon; Ru/MEC is a mesoporous carbon supported Ru monometal catalyst; Ni/MEC is a mesoporous carbon supported Ni monometal catalyst; Pt/MEC is a mesoporous carbon supported Pt monometal catalyst; Ru-1Ni/MEC is a mesoporous carbon supported Ru-Ni bimetallic catalyst, and the mass ratio of Ru to Ni is 4:1. Ru-1Ni/MEC is a mesoporous carbon supported Ru-Ni bimetallic catalyst, and the mass ratio of Ru to Ni is 1:1. Ru-4Ni/MEC is a mesoporous carbon supported Ru-Ni bimetallic catalyst, and the mass ratio of Ru to Ni is 1:4. The ratio of $H_2O_2$ to plastic was the mass ratio of hydrogen peroxide to polyolefin.

conditions were: a reaction temperature of 220° C., a reaction time of 60 min, reaction pressure 2 MPa; the main aqueous-phase product obtained by the pretreatment was acetic acid, and the gas-phase products were $CO_2$ and $O_2$.

Step 2 was the same as step 2 of Example 1; the catalyst was prepared in the same way as in Example 1.

Example 33

Step 1: Commercial 30% $H_2O_2$ of hydrogen peroxide solution was diluted with deionized water to prepare 80 ml of 0.5% $H_2O_2$ of hydrogen peroxide solution, and 0.16 g of low density polyethylene and the prepared dilute hydrogen peroxide solution were loaded into a hydrothermal reactor so that the ratio of $H_2O_2$ to plastic was 10:1; the reaction conditions were: a reaction temperature of 230° C., a reaction time of 60 min, reaction pressure 2 MPa; the main It can be seen from Examples 1-6 that when the concentration of $H_2O_2$ in the first reaction is 0.25%-1%, the yield and concentration of hydrogen obtained in the second reaction is better, and when the concentration of $H_2O_2$ is 0.5%, the hydrogen production effect is the best.

According to Examples 1-6, the relationship between the concentration of $H_2O_2$ and the yield of each product was studied. The results are shown in FIG. 1. In the figure, the abscissa indicates the concentration of $H_2O_2$ in wt %, and the ordinate indicates the yield of each product in mol/kg. In the figure, $C_1$-$C_3$ indicates $C_1$-$C_3$ alkane olefin, CO indicates carbon monoxide, $CO_2$ indicates $CO_2$, and $H_2$ indicates hydrogen. It can be seen from FIG. 1 that as the concentration of $H_2O_2$ decreases from 8% ($H_2$ yield was 3.05 mol/kg) to 0.5% ($H_2$ yield was 10.83 mol/kg), the $H_2$ yield shows an obvious increasing trend. However, when the concentration of $H_2O_2$ was further reduced to 0.25%, the $H_2$ production decreased from 10.83 mol/kg to 10.34 mol/kg, which decreased by 4.5%, which was due to the insufficient oxidation caused by the low concentration of $H_2O_2$. When the concentration of $H_2O_2$ is 0.25%, the output of $CO_2$ is 3.65 mol/kg. This is because $CO_2$ is not only produced by the peroxidation of carboxylic acid, but also directly formed during the oxidative cracking of C—C bond during the oxidative pretreatment. The high concentration $CO_2$ produced in the pretreatment process may be used for further carbon capture, utilization and storage.

Figure 2:
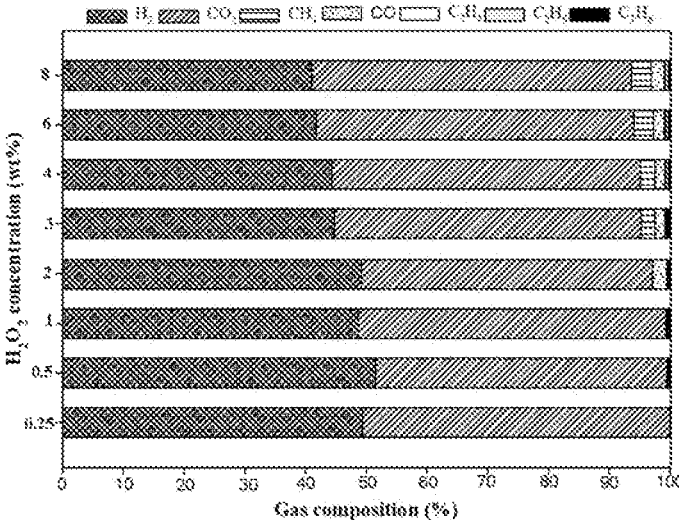
FIG. 2 is a graph of the concentration of $H_2O_2$ and the gas composition in the synthesis gas product of the present application.

According to Examples 1-6, the relationship between the concentration of $H_2O_2$ and the composition of gas components in the synthesis gas product was studied. The results are shown in FIG. 2. In the figure, the abscissa indicates the molar fraction of each gas component, and the ordinate indicates the concentration of $H_2O_2$ in wt %. For the reforming reaction, the molar fraction of $H_2$ in the product synthesis gas is more than 40%, and it reaches the maximum value (51.52%) when the concentration of $H_2O_2$ is 0.5% under all $H_2O_2$ concentrations.

$H_2O_2$, as a strong oxidant, will over-oxidize the raw materials at a high concentration (6%-8%), leading to oxidative cracking of C—C bonds, resulting in a higher byproduct $CO_2$ yield. Lowering the concentration of $H_2O_2$ will significantly reduce the $CO_2$ yield, which can effectively weaken the peroxidation of carboxylic acids produced in the pre-oxidation stage, thus ensuring that more carboxylic acids will participate in the reaction in the second hydrogen production process and promoting the production of hydrogen.

Figure 3:
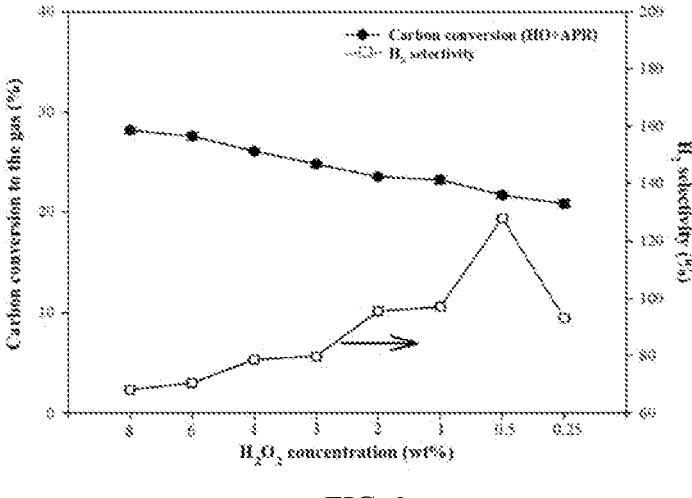
FIG. 3 is a graph showing the relationship between the concentration of $H_2O_2$ and the selectivity of hydrogen in the present application.

The relationship between $H_2O_2$ concentration and hydrogen selectivity was studied according to Examples 1-6, and the results are shown in FIG. 3. In the figure, the abscissa indicates the concentration of $H_2O_2$ in wt %, and the ordinate indicates the mole fraction of $CO_2$ in synthesis gas and hydrogen selectivity; It can be seen from FIG. 3 that during the reforming reaction, with the decrease of $H_2O_2$ concentration, the conversion of carbon to $CO_2$ increases.

Figure 4:
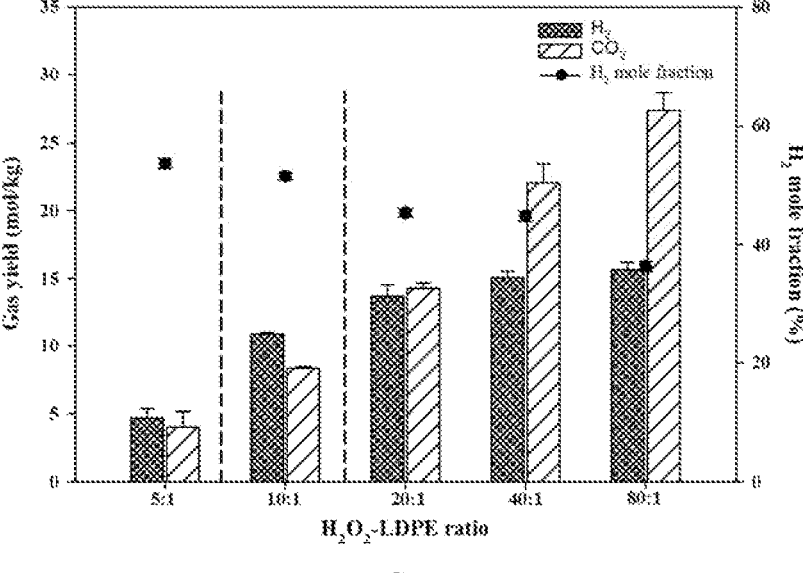
FIG. 4 is a graph showing the relationship between the mass ratio of hydrogen peroxide to polyolefin and the yield of synthesis gas.

According to Example 5 and Examples 7-11, the effect of hydrogen peroxide-polyolefin ratio on synthesis gas yield was studied, and the results are shown in FIG. 4. In the figure, the abscissa indicates the mass ratio of hydrogen peroxide-polyolefin, and the ordinate indicates the synthesis gas yield and the mole fraction of hydrogen and $CO_2$ in synthesis gas. It can be seen from FIG. 4 that when the mass ratio of hydrogen peroxide to polyolefin is 10:1, the concentration of hydrogen in the synthesis gas obtained in the second stage process and the yield of synthesis gas are the best.

Figure 5:
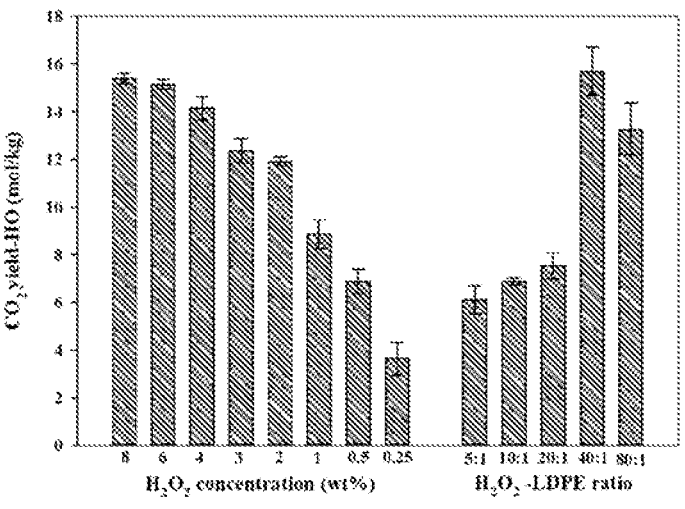
FIG. 5 is a graph showing the relationship between $H_2O_2$ concentration and $CO_2$ produced by pre-oxidation treatment in the present application.

According to Examples 1-6, the effect of $H_2O_2$ concentration on $CO_2$ produced by pre-oxidation treatment was studied, and the results are shown in FIG. 5. In the figure, the left abscissa indicates the concentration of $H_2O_2$ in wt %, the right abscissa indicates the mass ratio of hydrogen peroxide to polyolefin, and the ordinate indicates the output of $CO_2$ in mol/kg. It can be seen from FIG. 5 that the amount of $CO_2$ produced in the oxidation pretreatment process increases with the decrease of the amount of plastic. This may be due to the fact that during the cleavage of C—C bond, more $H_2O_2$ promotes the production of $CO_2$, rather than over oxidation. However, when the mass ratio of hydrogen peroxide to polyolefin is higher, the reforming process produces more $CO_2$, which leads to the decrease of the molar fraction of $H_2$ in the gas product.

To sum up, it can be concluded that when the concentration of $H_2O_2$ in the first reaction is 0.25%-1%, the yield and concentration of hydrogen in the second reaction is better, and when the concentration of $H_2O_2$ is 0.5%, the hydrogen production effect is the best.

According to Example 5 and Examples 12-14, when the pretreatment temperature in the first stage is 200° C., the $H_2$ yield and concentration in the synthesis gas obtained in the second stage are the highest.

According to examples 5 and 15-19, the order of the catalytic performance of mesoporous carbon supported Ru, Ni, Pt monometallic catalysts and Ru—Ni bimetallic catalyst in the second stage of the present application is Ru/MEC>4Ru-1Ni/MEC>1Ru-1Ni/MEC>Pt/MEC>1Ru-4Ni/MEC>Ni/MEC. The pore structures of the fresh catalysts in Example 5 and Examples 14-17 were characterized, and the results are shown in Table 2.

TABLE 2

| Catalyst | Specific surface area (m²/g) | Pore volume (cm³/g) | Average pore size (nm) |
|---|---|---|---|
| MEC | 1321.95 | 1.71 | 5.17 |
| Ru/MEC | 1211.57 | 1.42 | 4.7 |
| 4Ru—1Ni/MEC | 1301.93 | 1.67 | 5.12 |
| 1Ru—1Ni/MEC | 1288.99 | 1.63 | 5.07 |
| 1Ru—4Ni/MEC | 1206.17 | 1.54 | 5.09 |
| Ni/MEC | 1203.87 | 1.58 | 5.23 |

Figure 6:
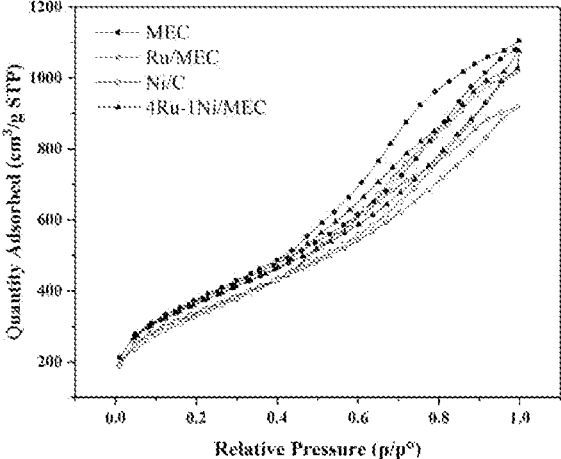
FIG. 6 is the nitrogen adsorption-desorption isotherm of the fresh catalyst synthesized by the present application.
Figure 7:
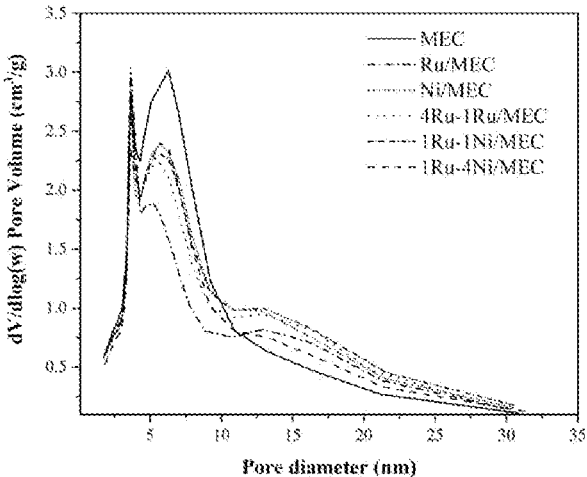
FIG. 7 is a schematic diagram of pore size distribution of fresh catalyst synthesized by the present application.

The nitrogen adsorption-desorption isotherms of the fresh catalysts synthesized in Example 5 and Examples 15-19 are shown in FIG. 6. In FIG. 6, the abscissa indicates the relative pressure $P/P^0$, where $P^0$ indicates the saturated vapor pressure of the gas at the adsorption temperature, P indicates the pressure of the gas phase at the adsorption equilibrium, and the ordinate indicates the adsorption amount measured in the standard state (unit: cm³/g); the pore size distribution of the fresh catalyst was shown in FIG. 7, where the abscissa indicates the pore size (unit: nm) and the ordinate indicates the pore volume (cm³/g). It can be seen from FIG. 6 and FIG. 7 that all catalysts are type IV isotherms, with narrow pore size distribution and the center at about 5 nm. This is because these catalysts have a developed mesoporous structure, and these catalysts have a specific surface area of 1,000-1,400 m²/g. Compared with mesoporous carbon, the specific surface area and pore volume of all mesoporous carbon supported metal-based catalysts are lower, which is due to the introduction of metal particles in the pores of mesoporous carbon, resulting in the decrease of the specific surface area and pore volume. Compared with Ru/MEC, 4Ru-1Ni/MEC has higher specific surface area and pore volume, while 1Ru-1Ni/MEC and 1Ru-4Ni/MEC have lower specific surface area and pore volume. These results show that the addition of a small amount of the second metal improves the texture performance of the monometal catalyst.

Figure 8:
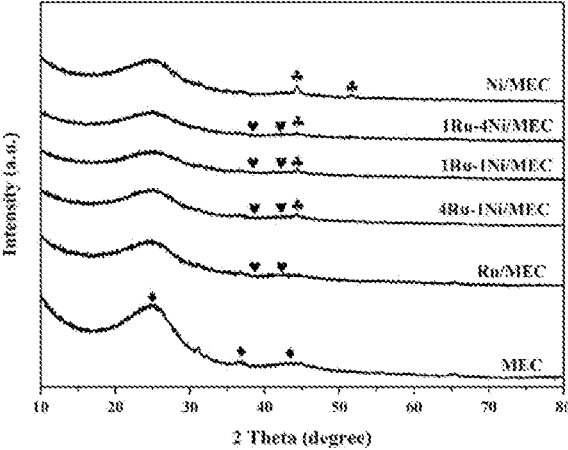
FIG. 8 is an XRD schematic diagram of a fresh catalyst synthesized by the present application.

The XRD spectra of Ni/MEC, Ru/MEC and bimetallic catalysts with different molar ratios are shown in FIG. 8. For Ni/MEC, there are big peaks at 44.5° and 51.5°, which correspond to the Ni (111) plane and the Ni (200) plane respectively. In the XRD spectra of Ru/MEC and Ru-based bimetallic catalysts, there are two weak peaks at 38.5° and 42.3°, respectively, which represent the 100 and 002 crystal planes of Ru species. The weak diffraction peaks of the metal Ru in Ru/MEC and Ru—Ni bimetallic catalysts show that Ru nanoparticles are small in size and highly dispersed on the surface of MEC, which is consistent with the scanning results of the electron microscope. Small nanoparticles can provide more surface atoms, thus improving their catalytic activity.

According to Example 5, Example 17 and Examples 20-25, the mesoporous carbon supported Ru—Ni bimetallic catalyst shows higher stability than Ru monometal under the operating conditions of the present application.

Figure 9A:
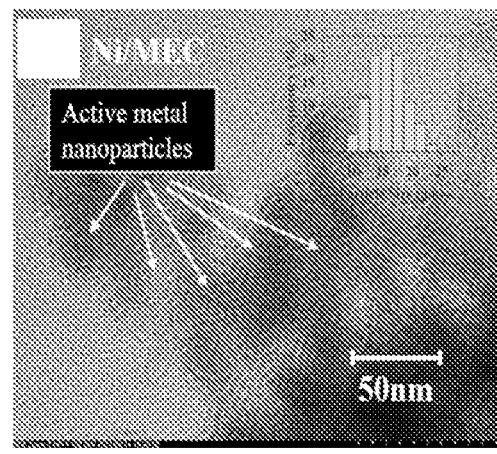
FIGS. 9A-9C are TEM images and particle size distribution diagrams of the mesoporous carbon supported catalyst of the present application.
Figure 9B:
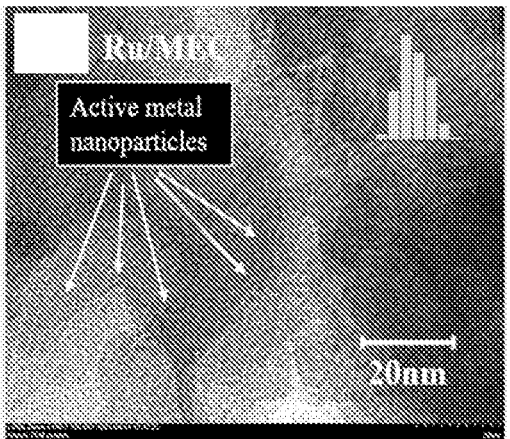
Figure 9C:
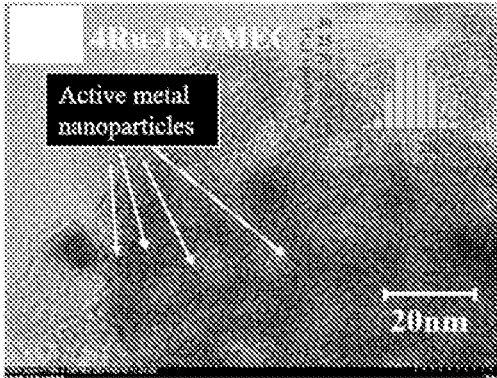

The TEM images and particle size distribution of single and bimetallic carbon supported catalysts are shown in FIGS. 9A-9C. FIG. 9A is the TEM and particle size distribution image of Ni/MEC, FIG. 9B is the TEM and particle size distribution image of Ru/MEC, and FIG. 9C is the TEM and particle size distribution image of 4Ru-1Ni/MEC. The average particle size of Ru—Ni is 14.1 nm, which is larger than that of monometal Ru/MEC (with an average particle size of 7.2 nm). This phenomenon may be due to the synergistic effect of Ru and Ni. After observation, Ru and Ni atoms are almost in the same position, and each atom is not separated in the whole imaging area, which indicates that a uniform Ru—Ni alloy structure is formed.

Further study the influence of the operating parameters of the oxidation pretreatment reaction on the performance of the oxidation pretreatment in the first stage and the reforming reaction in the second stage. The experimental results are shown in Table 3:

decreased after use. Although the average pore size of the two catalysts has decreased after use, the pore size distribution of the catalysts is still narrow, and the center position is about 5 nm. In addition, no NiO peak was observed in the XRD spectrum of mesoporous carbon supported Ru—Ni bimetallic catalyst, which may be due to the inhibition of metal Ru on Ni oxidation. Compared with the second operation, the hydrogen production in the third and fourth operation has little change, but the molar fraction of $H_2$ keeps decreasing. The $H_2$ yield and $H_2$ mole fraction in the mesoporous carbon supported Ru—Ni bimetallic catalyst reforming process are higher than those of mesoporous carbon supported Ru bimetallic catalyst. This shows that due to the interaction between two metals, Ru—Ni bimetallic catalyst has higher stability than monometal Ru catalyst.

The above embodiments are illustrative of the present application, but not restrictive, and any simple modification of the present application belongs to the scope of protection of the present application.

What is claimed is:

1. A method for preparing a hydrogen-containing synthesis gas by degrading polyolefin waste plastics at a low temperature, comprising the following steps:
   (1) weighing 1 part by weight of the polyolefin waste plastics and more than 3 parts by weight of hydrogen

TABLE 3

| Oxidation pretreatment time (min) | Temperature (° C.) | Carbon is converted into gas (%, pretreatment + reforming) | $H_2$ (%, reforming) | Gas output (mol/kg) | | | $H_2$ selectivity (%) | $CO_2$ output (mol/kg) | Acetic acid output (mol/kg) |
|---|---|---|---|---|---|---|---|---|---|
| | | | | H2 | $CO_2$-reforming | $C_2$-$C_3$ | | | |
| 60 | 180 | 12.83 | 47.23 | 5.29 | 6.12 | 0.037 | 85.94 | 2.93 | 1.48 |
| 60 | 190 | 18.56 | 48.97 | 8.22 | 8.87 | 0.058 | 92.16 | 4.22 | 1.68 |
| 60 | 200 | 21.68 | 51.52 | 10.84 | 8.36 | 0.108 | 127.92 | 6.88 | 2.00 |
| 60 | 210 | 25.13 | 50.62 | 9.92 | 9.99 | 0.070 | 98.57 | 7.74 | 1.86 |
| 60 | 220 | 28.76 | 51.13 | 10.30 | 10.17 | 0.074 | 100.61 | 10.13 | 1.85 |
| 60 | 230 | 27.31 | 51.26 | 8.61 | 8.44 | 0.065 | 101.22 | 10.84 | 1.93 |
| 30 | 200 | 16.32 | 50.58 | 7.93 | 8.01 | 0.050 | 98.35 | 3.5 | 1.82 |
| 60 | 200 | 21.68 | 51.52 | 10.84 | 8.36 | 0.108 | 127.92 | 6.88 | 2.00 |
| 90 | 200 | 22.88 | 52.53 | 9.41 | 8.78 | 0.063 | 106.45 | 7.37 | 1.86 |
| 120 | 200 | 27.70 | 51.63 | 9.83 | 9.51 | 0.066 | 102.62 | 10.04 | 1.80 |

It can be seen from Table 3 that the oxidation reaction of polyolefin is weakened at a lower hydrothermal temperature, and the decarboxylation reaction of organic compounds, that is, the thermal cracking of long-chain carboxylic acids, may occur in the hydrothermal environment above 220° C. Too long pre-oxidation reaction time will adversely affect the reforming reaction. When the time of oxidation pretreatment is 60 min and the temperature is 200° C., the yield of acetic acid is the highest, which is most beneficial to the subsequent reforming reaction.

The catalytic activity of fresh bimetallic 4Ru-1Ni/MEC catalyst was the most similar to that of monometal Ru catalyst, so 4Ru-1Ni/MEC catalyst and Ru/MEC catalyst were selected for stability test and comparison. After each use, the catalyst was recovered and dried overnight in an oven at 105° C. Compared with the first run, the $H_2$ yield and $H_2$ mole fraction in the second run decreased obviously, and the changes in the third and fourth runs were stable. The degradation of catalyst performance is due to the deactivation of catalyst caused by carbon deposition and active metal sintering.

The results of Examples 20-25 show that the specific surface areas of 4Ru-1Ni/MEC and Ru/MEC catalysts have peroxide solution, wherein a concentration of $H_2O_2$ in the hydrogen peroxide solution is 0.25%-6%;
   (2) feeding the polyolefin waste plastics and the hydrogen peroxide solution into a first hydrothermal reactor, and carrying out an oxidation pretreatment reaction at a reaction temperature of 150° C.-230° C., and obtaining an aqueous-phase product and a gas-phase product after the oxidation pretreatment reaction is finished;
   (3) filling a second hydrothermal reactor with a mesoporous carbon supported metal-based catalyst, and then introducing the aqueous-phase product obtained in the step (2) into the second hydrothermal reactor for a reforming reaction to obtain a hydrogen-containing synthesis gas product.

2. The method for preparing the hydrogen-containing synthesis gas by degrading the polyolefin waste plastics at the low temperature according to claim 1, wherein a content of the $H_2O_2$ in the hydrogen peroxide solution in the step (1) is 0.5%-2%.

3. The method for preparing the hydrogen-containing synthesis gas by degrading the polyolefin waste plastics at the low temperature according to claim 1, wherein a weight of the hydrogen peroxide solution in the step (1) is 3 parts-80 parts by weight.

4. The method for preparing the hydrogen-containing synthesis gas by degrading the polyolefin waste plastics at the low temperature according to claim 3, wherein the weight of the hydrogen peroxide solution in the step (1) is 5 parts-10 parts by weight, a reaction pressure in the step (2) is 0.5 MPa-2 MPa, and a reaction time is 30 min-90 min.

5. The method for preparing the hydrogen-containing synthesis gas by degrading the polyolefin waste plastics at the low temperature according to claim 4, wherein in the step (2), the reaction temperature is 190° C.-200° C., the reaction pressure is 1 MPa, and the reaction time is 30 min-60 min.

6. The method for preparing the hydrogen-containing synthesis gas by degrading the polyolefin waste plastics at the low temperature according to claim 1, wherein a main component of the aqueous-phase product obtained in the step (2) is acetic acid, and the gas-phase product is oxygen and $CO_2$.

7. The method for preparing the hydrogen-containing synthesis gas by degrading the polyolefin waste plastics at the low temperature according to claim 1, wherein a reaction temperature of the reforming reaction in the step (3) is 200° C.-240° C., a reaction pressure of the reforming reaction in the step (3) is 2 MPa-4 MPa, and a reaction time of the reforming reaction in the step (3) is 120 min-180 min.

8. The method for preparing the hydrogen-containing synthesis gas by degrading the polyolefin waste plastics at the low temperature according to claim 1, wherein the mesoporous carbon supported metal-based catalyst in the step (3) is one or more of a mesoporous carbon supported Ru monometal, a mesoporous carbon supported Ni monometal, a mesoporous carbon supported Pt monometal, and a mesoporous carbon supported Ru—Ni bimetal.

9. The method for preparing the hydrogen-containing synthesis gas by degrading the polyolefin waste plastics at the low temperature according to claim 8, wherein the mesoporous carbon supported metal-based catalyst in the step (3) is a mesoporous carbon supported Ru—Ni bimetallic catalyst, and a mass ratio of Ru to Ni is 4:1, 1:1, or 1:4.

10. The method for preparing the hydrogen-containing synthesis gas by degrading the polyolefin waste plastics at the low temperature according to claim 1, wherein the polyolefin waste plastics are selected from one or more of polypropylene, a low-density polyethylene, and a high-density polyethylene.

\* \* \* \* \*